US012060248B2

(12) United States Patent
Kashiwakura

(10) Patent No.: US 12,060,248 B2
(45) Date of Patent: Aug. 13, 2024

(54) ELEVATOR SAFETY DEVICE

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 690 days.

(21) Appl. No.: 17/229,071

(22) Filed: Apr. 13, 2021

(65) Prior Publication Data

US 2021/0323792 A1 Oct. 21, 2021

(30) Foreign Application Priority Data

Apr. 20, 2020 (JP) ................................ 2020-074471

(51) Int. Cl.
*B66B 13/00* (2006.01)
*B66B 13/26* (2006.01)

(52) U.S. Cl.
CPC .................................... *B66B 13/26* (2013.01)

(58) Field of Classification Search
CPC ......... B66B 13/26; B66B 13/16; B66B 13/28; B66B 5/00
See application file for complete search history.

(56) References Cited

U.S. PATENT DOCUMENTS

| | | | | |
|---|---|---|---|---|
| 3,857,466 A * | 12/1974 | Berkovitz | B66B 13/26 | 250/221 |
| 2011/0155511 A1* | 6/2011 | Sun | B66B 13/26 | 187/317 |
| 2021/0323792 A1* | 10/2021 | Kashiwakura | B66B 13/26 | |

FOREIGN PATENT DOCUMENTS

| | | | | |
|---|---|---|---|---|
| CN | 102421694 A | * | 4/2012 | B66B 13/06 |
| CN | 110127478 A | * | 8/2019 | B66B 3/00 |
| DE | 112020007234 T5 | * | 3/2023 | B66B 13/26 |
| DE | 112020007235 T5 | * | 3/2023 | B66B 13/26 |
| JP | 201058881 A | | 3/2010 | |
| JP | 2010235283 A | | 10/2010 | |
| JP | 2011011896 A | * | 1/2011 | |
| JP | 201271971 A | | 4/2012 | |
| JP | 2012153450 A | * | 8/2012 | |
| JP | 2014055045 A | * | 2/2014 | |
| JP | 201455045 A | | 3/2014 | |
| JP | 2014040292 A | * | 3/2014 | |
| JP | 20153786 A | | 1/2015 | |
| JP | 6799802 B1 | * | 12/2020 | B66B 13/26 |
| KR | 20020072784 A | * | 9/2002 | |
| WO | 2010024215 A1 | | 3/2010 | |
| WO | WO-2010024215 A1 | * | 3/2010 | B66B 13/26 |
| WO | WO-2010047202 A1 | * | 4/2010 | B66B 13/26 |
| WO | WO-2011010377 A1 | * | 1/2011 | B66B 13/06 |
| WO | WO-2021240594 A1 | * | 12/2021 | B66B 13/26 |
| WO | WO-2021240596 A1 | * | 12/2021 | B66B 13/26 |

* cited by examiner

*Primary Examiner* — Marlon T Fletcher
(74) *Attorney, Agent, or Firm* — The Webb Law Firm

(57) ABSTRACT

An elevator safety device includes: a light projector configured to emit light beam; a reflector reflecting the light beam emitted from the light projector; and a light receiver configured to receive the light beam reflected by the reflector. The light projector and the light receiver are arranged between a car landed on a landing floor and a wall of an elevator shaft and above an upper end of an entrance opening. The reflector is arranged between the car landed on the landing floor and the wall of the elevator shaft and below a lower end of the entrance opening.

2 Claims, 4 Drawing Sheets

ELEVATOR SAFETY DEVICE

CROSS-REFERENCE TO RELATED APPLICATION

This application claims priority to Japanese Patent Application No. 2020-074471 filed Apr. 20, 2020, the disclosure of which is hereby incorporated by reference in its entirety.

BACKGROUND OF THE INVENTION

Field of the Invention

The present invention relates to an elevator safety device.

Description of Related Art

Elevators each include a safety device configured to detect a state where an object is caught by a door. Known as an example of the safety device is a door edge sensor using a laser sensor, as disclosed in, for example, WO 2010/024215 A. For example, when a user uses an elevator with a pet animal such as a dog on a leash, it will be extremely dangerous if the pet animal and the user are separated between the landing floor and the car, that is, the leash extends between the inside and outside (landing floor) of the elevator but the elevator door still closes and the car begins moving up or down failing to detect the presence of the leash. The door edge sensor disclosed in WO 2010/024215 A includes: a laser oscillator and a sensor both provided on an upper portion of a leading end side (door closing side) of one of two door panels constituting a center-open type door device; and a reflector plate provided on a lower portion of the leading end side of the door panel and within a sill groove for installing a guide shoe. The door edge sensor is configured to reflect laser beam emitted from the laser oscillator on the reflector plate, and receive the reflected laser beam. The aforementioned leash or the like extending between the car and the landing floor can be detected by, for example, crossing the laser beam to thereby block the sensor's reception of the laser beam while the door in an open state starts closing to be in a fully-closed state.

When the door is closed, the door edge sensor using the laser sensor as aforementioned interferes with a leading end of a door panel opposite to the door panel equipped with the door edge sensor, that is, the laser is blocked by the opposite door panel. Thus, it is required that the upper portion of the opposite door panel be provided with a second reflector plate for reflecting the laser beam on the upper portion of the door panel immediately before the door is fully closed, and that the laser beam be reflected by the second reflector plate. However, when a pair of door panels are installed to be slightly inclined so as to have a clearance therebetween that is narrower as it advances downward, the laser beam is blocked by the lower portion of the opposite door panel or a cleaning tool for the reflector plate before being reflected by the second reflector plate. In order to prevent such a defect from occurring, the inclination of the door panels needs to be precisely adjusted, which involves extremely complicated working.

Further, a control is required to, for example, stop the irradiation of the laser beam while the door is open since there is a risk of damaging the user's eyes if he or she looks into the laser when the door is open.

In addition, the door edge sensor disclosed in WO 2010/024215 A has the reflector plate moving within the sill groove, and thus has a problem of becoming dirty or damaged by, for example, dust collected in the sill groove.

SUMMARY OF THE INVENTION

Technical Problem

In view of the above problems, it is an object of the present disclosure to provide an elevator safety device configured to allow a door to be easily installed.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Solution to Problem

The elevator safety device as one embodiment of the present invention is an elevator safety device provided on a door that opens and closes an entrance opening of an elevator, and configured to detect a detecting object present at the entrance opening during a closing operation of the door, the elevator safety device including: a light projector configured to emit light beam; a reflector reflecting the light beam emitted from the light projector; and a light receiver configured to receive the light beam reflected by the reflector, wherein the light projector and the light receiver are arranged between a car landed on a landing floor and a wall of an elevator shaft and above an upper end of the entrance opening, and the reflector is arranged between the car landed on the landing floor and the wall of the elevator shaft and below a lower end of the entrance opening.

The elevator safety device as one embodiment further includes: a support member provided on the door and extending in a vertical direction; a link member constituting a parallel link mechanism in cooperation with the support member so as to allow the support member to be pivotally movable between a first position that is a given position and a second position that is closer to a door opening side than the first position while maintaining an angle of the support member relative to the vertical direction; and a cam mechanism configured to allow the support member to move from the first position to the second position in association with the door moving to the door opening side, wherein the light projector, the light receiver, and the reflector are supported by the support member, the light beam passes through a door closing side of a closing side edge of the door when the support member is located at the first position, and the light beam passes through the door opening side of the closing side edge of the door when the support member is located at the second position. The light projector, the light receiver, and the reflector are arranged to allow the light beam to pass through the door closing side of the closing side edge of the door when the support member is located at the first position, and to allow the light beam to pass through the door opening side of the closing side edge of the door when the support member is located at the second position.

The elevator safety device as one embodiment is configured such that the cam mechanism includes: a roller operably connected to the support member; and a contacting member that contacts the roller to allow the support member to pivotally move, the roller and the contacting member contact each other to allow the support member to be located at the second position when the door is located at a position at which the door is open, and the roller and the contacting member are separated from each other to allow the support member to be located at the first position in association with the door moving from the position at which the door is open to the door closing side. The light projector, the light receiver, and the reflector are arranged such that the roller and the contacting member contact each other to allow the support member to be located at the second position when the door is located at the position at which the door is open, and that the roller and the contacting member are separated from each other to allow the support member to be located at the first position in association with the door moving from the position at which the door is open to the door closing side.

DESCRIPTION OF THE INVENTION

An embodiment of the present invention will be hereinafter described with reference to FIG. 1 to FIG. 3, and FIGS. 4A to 4D.

Figure 1:
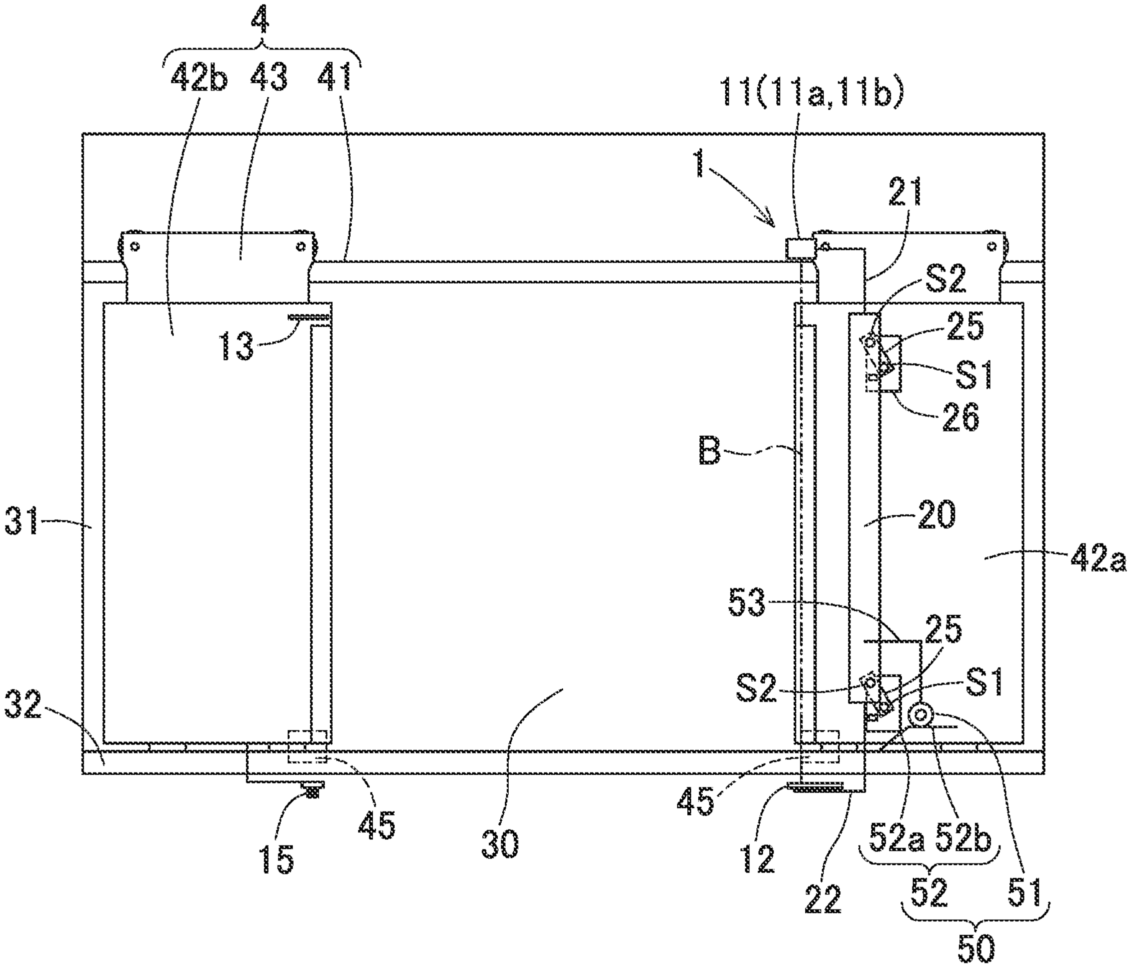
FIG. 1 is a front view of a center-open type car door in an open state, showing an elevator safety device according to one embodiment of the present invention that is arranged on the car door.

In an elevator that includes: an elevator shaft vertically extending across a plurality of floors in a building; and a car elevating and lowering within the elevator shaft, an elevator safety device 1 (hereinafter referred to as safety device) in one embodiment is provided on a car door 42 that opens and closes an entrance opening 30 of the car. As shown in FIG. 1, the car includes a car body 31 having a sill 32 and a door device 4. The door device 4 includes: a guide rail 41 extending above the entrance opening 30 and in a width direction (i.e., a right and left direction in FIG. 1: hereinafter referred to also as "opening and closing direction") of the entrance opening 30; the car door 42 that opens and closes the entrance opening 30; and a door hanger 43 capable of reciprocating along the guide rail 41 with the car door 42 hung thereon. The car door 42 in this embodiment is a so-called center-open type door having a pair of car door panels 42*a* and 42*b* capable of moving toward and away from each other to close and open the entrance opening 30 of the car.

The safety device 1 of this embodiment includes: a light projector 11*a*, such as a red semiconductor laser, configured to emit light beam B; a first reflector plate 12 reflecting the light beam B emitted from the light projector 11*a*; and a light receiver 11*b* configured to detect the light beam B reflected by the first reflector plate 12. The light receiver lib is configured to output a foreign object detection signal indicating that a foreign object as a detecting object is detected when the detection amount of the light beam B falls below a specific threshold. In this embodiment, the light projector 11*a* and the light receiver lib are integrated with each other to constitute a light projection and reception unit 11. The light projection and reception unit 11 is installed to any one of the pair of car door panels 42*a* and 42*b* to be located between the car landed on a landing floor and a wall of the elevator shaft, and located above an upper end of the entrance opening 30. More specifically, the light projection and reception unit 11 is installed to be located above the car door panel 42*a* on the right side of FIG. 1. The first reflector plate 12 is installed to the car door panel 42*a* to which the light projection and reception unit 11 is installed, so as to be located between the car landed on the landing floor and the wall of the elevator shaft, and located below a lower end of the entrance opening 30.

The car door panel 42*a* is further provided with a support member 20 extending in a vertical direction. The support member 20 supports the light projection and reception unit 11 via an upper stay 21 fixed to an upper portion of the supporting member 20, and supports the first reflector plate 12 via a lower stay 22 fixed to a lower portion of the support member 20. The support member 20 of this embodiment is a so-called angle member extending in the vertical direction and having substantially an L shape in cross section taken along a horizontal plane.

The upper stay 21 has one end fixed to the support member 20, and the other end provided with the light projection and reception unit 11. In order to locate the light projection and reception unit 11 between the car landed on the landing floor and the wall of the elevator shaft and above the upper end of the entrance opening 30, the upper stay 21 extends vertically to the position at which the light projection and reception unit 11 is provided, and extends outward of the car body (that is, to the landing floor side) along an entering and exiting direction of the car (that is, a direction orthogonal to the opening and closing direction of the car door and to the vertical direction).

The lower stay 22 has one end fixed to the support member 20, and the other end provided with the first reflector plate 12. In order to locate the first reflector plate 12 between the car landed on the landing floor and the wall of the elevator shaft and below the lower end of the entrance opening 30, the lower stay 22 extends outward of the car body (i.e., the car sill), that is, extends to the landing floor side from one end to the other end along the entering and exiting direction of the car (that is, the direction orthogonal to the opening and closing direction of the car door and to the vertical direction), and extends vertically to the position at which the first reflector plate 12 is provided.

The safety device 1 of this embodiment includes: a pair of link elements 25 (link members) constituting a parallel link mechanism in cooperation with the support member 20; and a pair of bases 26 configured to respectively fix the pair of link elements 25 to the car door. The pair of link elements 25 connect the respective bases 26 and the support member 20, and are arranged at an interval from each other in the vertical direction. Each of the link elements 25 is connected to each corresponding one of the bases 26 to be relatively rotatable about a shaft S1 extending in the entering and exiting direction, and is connected to the support member 20 to be relatively rotatable about a shaft S2 extending in the entering and exiting direction. This configuration allows the pair of link elements 25 to constitute the parallel link mechanism in cooperation with the support member 20.

The parallel link mechanism enables the support member 20 to be pivotally movable between a first position that is a given position and a second position that is closer to the door opening side than the first position while maintaining an angle (posture) of the support base 20 relative to the vertical direction. In this embodiment, the first position is a position at which the support member 20 is located closest to the door closing side among the movable range of the support member 20 connected to the pair of link elements 25. In each of the pair of link elements 25, a centerline connecting the shaft S1 and the shaft S2 is substantially horizontal when the support member 20 is located at the first position. In the first position, at least one of the pair of link elements 25 contacts a restricting member 27 to restrict the link element 25 from further pivotally moving and enable the support member 20 to pivotally move only to the second position side.

In this embodiment, the second position is a position at which the support member 20 connected to the link elements 25 pivotally moves upward from the first position to the door opining side by a specific distance, and is a position closer to the door closing side than the position at which the support member 20 reaches the highest position among the movable range of the support member 20. In other words, each of the pair of link elements 25 has a virtual line connecting the shaft S1 and the shaft S2 turning about the shaft S1 by an angle of less than 90 degrees in association with the support member 20 pivotally moving from the first position to the second position. The configuration can also be such that at least one of the pair of link elements 25 is made to contact a restricting member (not shown) at the second position to restrict its further pivotal movement. Such a configuration allows the support member 20 to be constantly subjected to the force of gravity so that the support member 20 tends to pivotally move from the second position side to the first position side.

Figure 2:
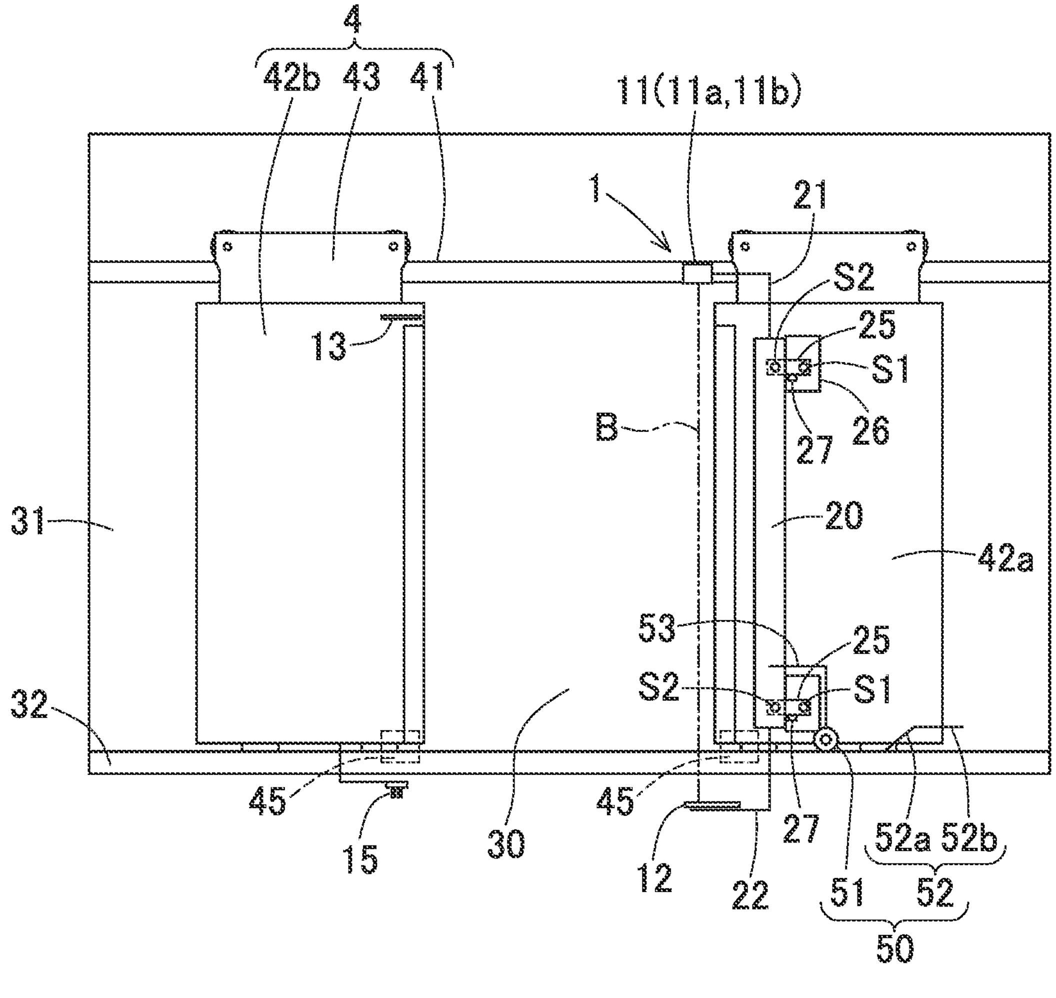
FIG. 2 is a front view of the car door in a closing operation, showing the elevator safety device according to the one embodiment.
Figure 3:
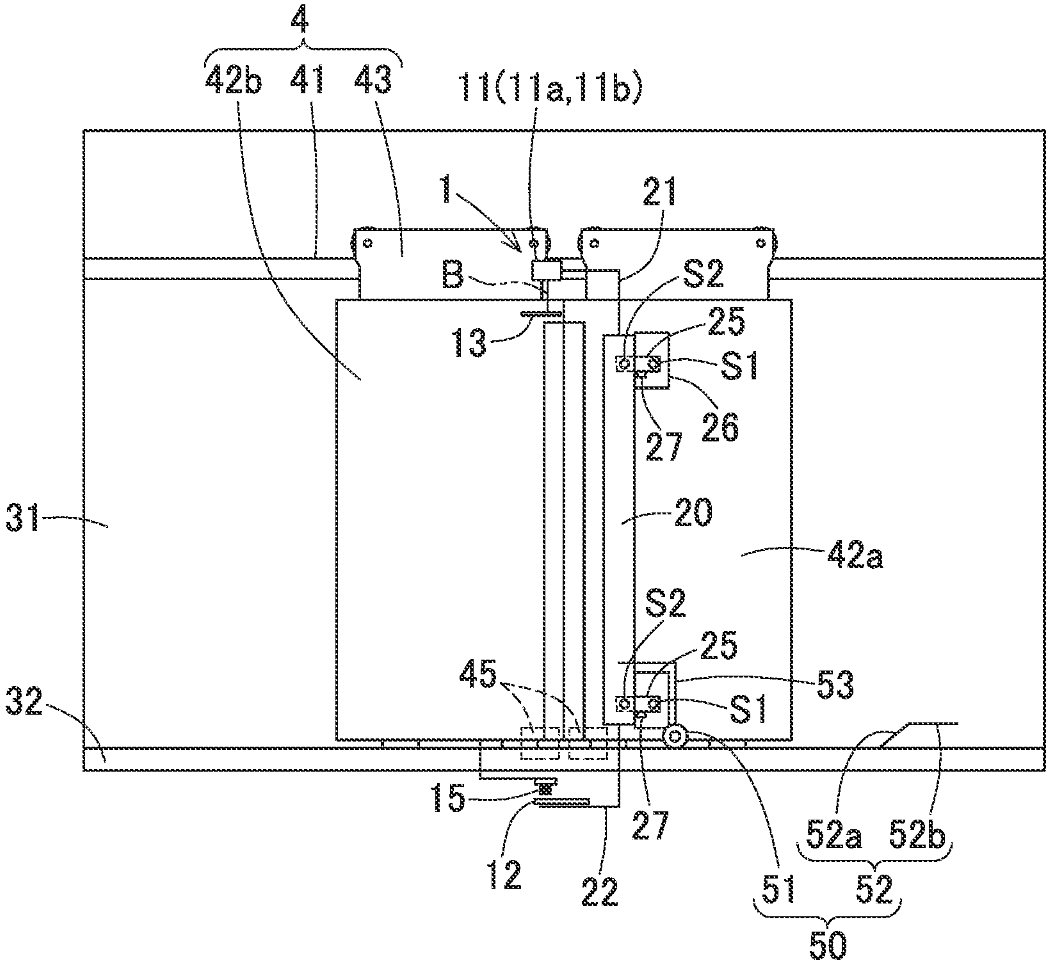
FIG. 3 is a front view of the car door in a closed state, showing the elevator safety device of the one embodiment.

As shown in FIGS. 1 to 3, a cam mechanism 50 configured to move the support member 20 from the first position to the second position is provided below the support member 20. In this embodiment, the cam mechanism 50 includes: a roller 50 operably connected to the support member 20; and a contacting member 52 that contacts the roller 51 to allow the support member 20 to pivotally move. In this embodiment, the roller 51 is connected to the support member 20 via a connecting member 53. An upper portion of the connecting member 53 is fixed to a lower portion of the support member 20, and the roller 51 is provided on a lower portion of the connecting member 53. The contacting member 52 is provided on a part of a floor of the car body 31, such as the sill, and is located at a position at which it contacts the roller 51 before the car door panel 42*a* is fully open. The contacting member 52 in this embodiment has an inclined surface 52*a* inclined relative to the opening and closing direction of the car door, and a horizontal surface 52*b* extending horizontally from the upper end of the inclined surface 52*a*. The upper end of the inclined surface 52*a* and the horizontal surface 52*b* both have such a height as to allow the support member 20 to be pushed up from the first position to the second position when the roller 51 contacts the inclined surface 52*a* and the horizontal surface 52*b* to be pushed upward.

When the car door panel 42*a* in the closed state moves by the opening operation to the door opening side, the parallel link mechanism and the cam mechanism configured as above allow the roller 51 to contact the inclined surface 52*a* of the contacting member 52 before the car door panel 42*a* is fully open, and allow the roller 51 to be guided upward along the inclined surface 52*a* in association with the further movement of the car door. This configuration allows the support member 20 connected to the roller 51 via the connecting member 53 to pivotally move from the first position to the second position before the car door panel 42*a* moves from the door closed position to the door opening side and becomes a fully open state.

The light projection and reception unit 11 and the first reflector plate 12 are arranged to be opposed to each other in the vertical direction, and are arranged to allow the light beam B emitted from the light projection and reception unit 11 to be reflected by the first reflector plate 12 and detected by the light projection and reception unit 11. The path in which the light beam B travels is substantially linear from the light projection and reception unit 11 to the first reflector plate 12 and back to the light projection and reception unit 11 again.

When the support member 20 is located at the first position, the light beam B passes through an area on the door closing side a certain distance, for example 5 to 20 mm off a closing side edge of the car door panel 42*a*, as shown in, for example, FIG. 2. When the supporting member 20 pivotally moves from the first position to the second position, that is, pivotally moves to the door opening side, the light projection and reception unit 11 and the first reflector plate 12 that are supported by the supporting member 20 also pivotally move, in association with which the light beam B also moves to the door opening side. When the supporting member 20 reaches the second position, the path of the light beam B moves to an area on the door opening side a certain distance, for example 5 to 20 mm off the closing side edge of the car door panel 42*a*. This configuration allows the path of the light beam B to be located between the car door panel 42*a* and a corresponding landing door panel and hence blocked from being viewed when the car door panel 42*a* stands still in the open state.

It is preferable that an underguard 45 be provided to project downward at the lower end of the closing edge of the car door panel 42*a*, and that the path of the light beam B move back to an area on the door opening side of a door closing side edge of the underguard 45 when the door is open.

When the car door panel 42*a* in the open state moves by the closing operation to the door closing side, the roller 51 that has been pushed upward by the horizontal surface 52*b* of the contacting member 52 rolls down along the inclined surface 52*a*, and rolls away from the inclined surface 52*a* in association with the further movement of the car door panel 42*a*. Accordingly, the support member 20 connected to the roller 51 via the connecting member 53 pivotally moves from the second position to the first position as the car door panel 42*a* moves to the door closing side from a position at which the door is open.

A car door panel 42*b*, which is opposite to the car door panel 42*a* to which the light projection and reception unit 11 and the first reflector plate 12 are provided, includes: a cleaning tool 15 having a brush for cleaning a light beam reflecting surface of the first reflector plate 12 when the door is in the closed state; and a second reflector plate 13 for reflecting the light beam B before the light beam B is blocked by the cleaning tool 15 to transmit the light beam B back to the light projection and reception unit 11. Another underguard 45 is provided to project downward at a lower end on the door closing side of the opposite car door panel 42*b* to prevent foreign objects from intruding between the car door panel 42*b* and the sill 32.

Figure 4A:
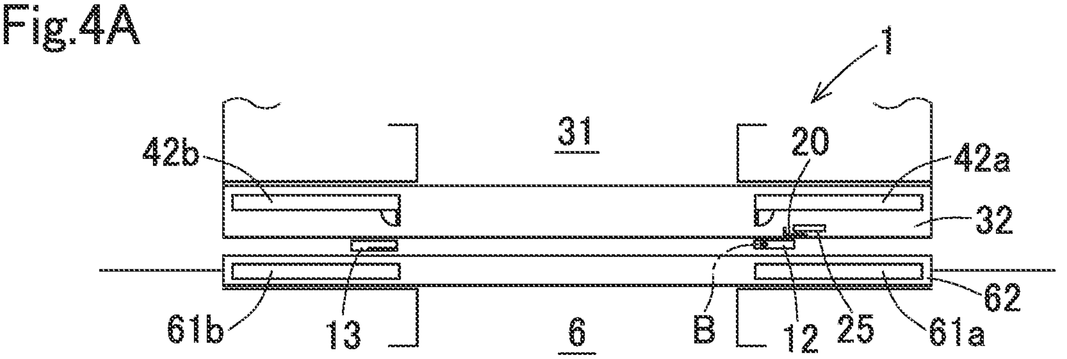
FIGS. 4A to 4D are respectively schematic explanatory views for the movement of the elevator safety device of the one embodiment when an elevator door is in a closing operation.

According to the elevator safety device 1 configured as above, when the car door 42 is in the full open state, the support member 20 is retained at the second position by the cam mechanism, and the path of the light beam B lies between the car door panel 42*a* and an opposite landing door panel 61*a*, more specifically, between the sill 32 of the car body 31 and a sill 62 of a landing floor 6, and is located on the door opening side of the closing side edges respectively of the car door panel 42*a* and the landing door panel 61*a*, as shown in FIG. 1 and FIG. 4A. Thus, the elevator safety device 1 is configured to prevent users from looking into the light beam B when the car door 42 is in the full open state, and is safe for the users. Further, there is no need for complicated control to stop the irradiation of the laser beam B while the door is in the open state.

Figure 4B:
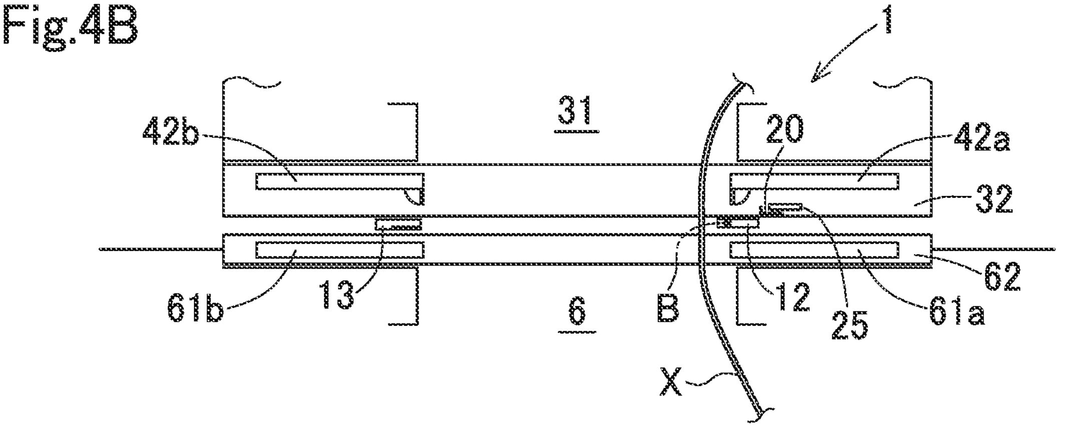

When the car door 42 starts a closing operation, the support member 20 pivotally moves by its own weight from the second position toward the first position, and accordingly the path of the light beam B moves to the closing side of the car door panel 42*a*, and overtakes the closing side edge of the car door panel 42*a* to reach the door closing side of the closing side edge of the car door panel 42*a*, as shown in FIG. 2 and FIG. 4B.

Figure 4C:
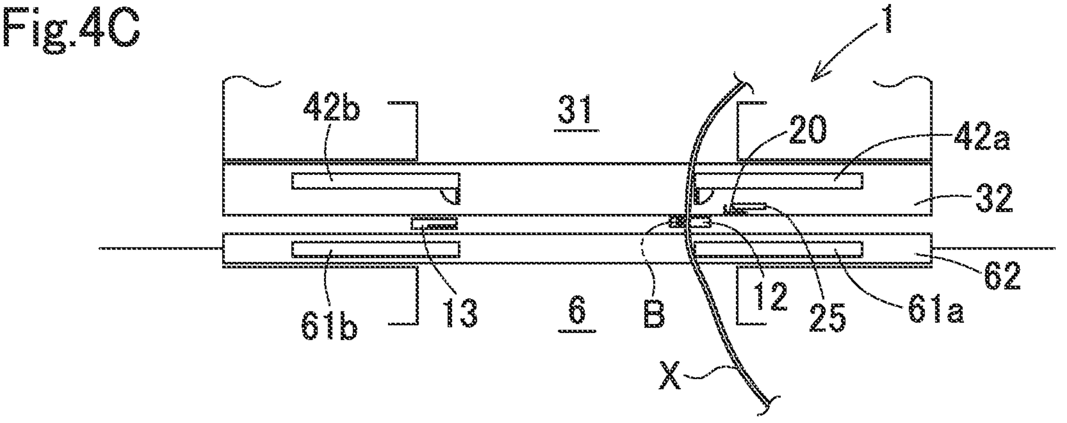

As shown in FIG. 4C, a foreign object X such as a leash crossing the light beam B during the closing operation of the car door 42 blocks the light beam B to thereby interrupt detection of the light beam B by the light projection and reception unit 11, and then the light projection and reception unit 11 outputs a foreign object detection signal representing the presence of a foreign object in a detection area. In the case where a foreign object is present on a pathway of the car door panel 42*b*, which is opposite to the car door panel 42*a* to which the light projection and reception unit 11 and the first reflector plate 12 are provided, the foreign object is guided to the door closing side by the car door panel 42*b* or the underguard 45 to cross the light beam B before the door is fully closed. This configuration allows the safety device to detect even a foreign object below the car door panel 42*b*, which is opposite to the car door panel 42*a* on which the light projection and reception unit 11 is provided. The foreign object detection signal output by the light projection and reception unit 11 is transmitted to an elevator control unit (not shown) to allow the control unit to perform the reverse operation, that is, switch door operation from the closing operation to the opening operation.

Figure 4D:
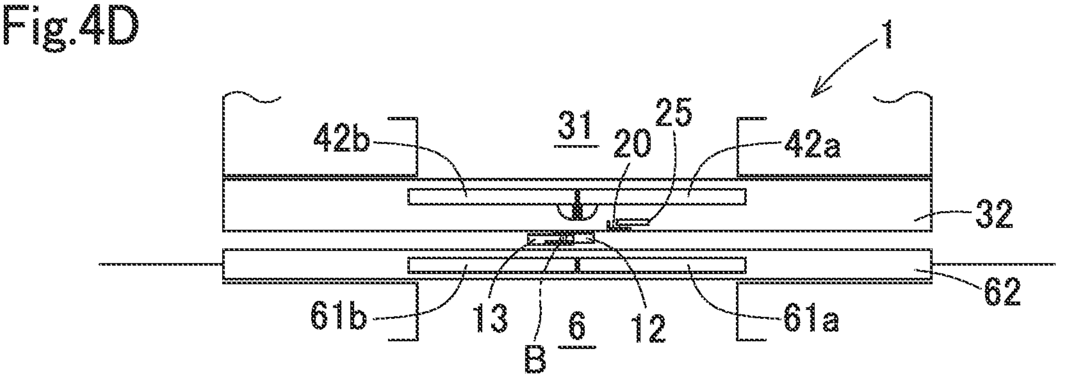

When the door is closed with no foreign object detected during the closing operation, as shown in FIG. 3 and FIG. 4D, the second reflector plate 13 reflects the light beam B to transmit the light beam B back to the light projection and reception unit 11 immediately before the first reflector plate 12 comes into contact with the cleaning tool 15, so that the closing operation is completed with no output of the foreign object detection signal.

Since the elevator safety device according to this embodiment includes the light projection and reception unit 11 and the first reflector plate 12 that are arranged between the car and the wall of the elevator shaft, the light projection and reception unit 11 does not interfere with the opposed car door panel 42*b* when the car door panel 42*a* is closed. This configuration produces an effect of increasing an allowable range of angles at which the car door is installed.

The closing operation can be accomplished while the support member 20 is located at the first position, that is, while detection using the light beam B is performed to detect a foreign object present in an area on the door closing side a certain distance off the closing side edge of the car door 42, and the detection using the light beam B can continue to detect a foreign object over a range beyond the closing side edge of the opposed car door panel 42*b*, that is, beyond the doorstop surfaces of the car door panels 42*a* and 42*b*. This configuration in this embodiment enables detection of a foreign object present in an area beyond the doorstop surface of the opposed door panel, that is, present between a lower surface of the opposed door panel and the sill, which could not be conventionally achieved.

According to the elevator safety device 1 of this embodiment, the first reflector plate 12 does not become dirty or damaged by dust or the like collected in the sill groove since the first reflector plate 12 is not configured to move in the sill groove unlike the conventional one, and thus a false detection of foreign objects can be prevented.

It is a matter of course that the elevator safety device of the present invention is not limited to the aforementioned embodiment, but various modifications can be made without departing from the gist of the present invention. For example, a configuration of an embodiment may be added to a configuration of another embodiment, and part of a configuration of an embodiment may be replaced by a configuration of another embodiment. Further, part of a configuration of an embodiment may be deleted.

The aforementioned embodiment has been described by taking, for example, the case where the elevator safety device is provided on a so-called center-open type door, which includes a pair of door panels respectively opening to both sides in the width direction of the entrance opening, without limitation thereto. The elevator safety device of the present invention may be provided on a so-called single-opening type door, which opens to one side in the width direction of the entrance opening.

The aforementioned embodiment has been described by taking, for example, the case where the elevator safety device is provided on the car door, without limitation thereto. The elevator safety device may be provided on the landing door configured to open and close the entrance opening of the elevator. The door configured to open and close the entrance opening of the elevator is generally provided with a member called safety shoe, which is elongated in the vertical direction, along with the link mechanism. The safety device according to the present invention can be used in combination with such a safety shoe.

The aforementioned embodiment has been described by taking, for example, the case where the light projection and reception unit in which a light projector configured to emit light beam and a light receiver configured to detect the light beam are integrated together is used, but the light projector and the light receiver may be separate bodies from each other. In the case where the light projector and the light receiver are separate bodies from each other, the light projector and the light receiver may be arranged at different positions from each other.

The aforementioned embodiment has been described by taking, for example, the case where the cam mechanism includes: the roller operably connected to the support member; and the contacting member configured to allow the support member to pivotally move when the roller contacts the contacting member, without limitation thereto. The configuration of the cam mechanism is not particularly limited as long as it converts a force in the right and left direction (i.e., horizontal direction) generated by the opening and closing operations of the door into a force in the vertical direction for causing the support member to pivotally move in the vertical direction.

As an another example, the configuration of the cam mechanism may be such that the cam mechanism includes: a contacting member fixed to the car body or the landing floor and having a contacting surface directed to the closing side; and a cam member having a reverse L shape and pivotally supported at the door so as to be pivotally movable about a shaft extending in the entering and exiting direction, and that the cam member has one end portion operably connected to the support member, and the other end portion configured to contact the contacting surface of the contacting member before the door is fully open. According to the cam mechanism configured as above, the other end portion of the cam member contacts the contacting surface of the contacting member when the door is fully open to thereby allow the cam member to rotate, so that the one end portion of the cam member enables the supporting member to be pushed upward.

What is claimed is:

1. An elevator safety device provided on a door that opens and closes an entrance opening of an elevator, and configured to detect a detecting object present at the entrance opening during a closing operation of the door, the elevator safety device comprising:

a light projector configured to emit light beam;

a reflector reflecting the light beam emitted from the light projector;

a light receiver configured to receive the light beam reflected by the reflector;

a support member provided on the door and extending in a vertical direction;

a link member constituting a parallel link mechanism in cooperation with the support member so as to allow the support member to be pivotally movable between a first position that is a given position and a second position that is closer to a door opening side than the first position while maintaining an angle of the support member relative to the vertical direction; and a cam mechanism configured to allow the support member to move from the first position to the second position in association with the door moving to the door opening side, wherein the light projector and the light receiver are arranged between a car landed on a landing floor and a wall of an elevator shaft and above an upper end of the entrance opening, the reflector is arranged between the car landed on the landing floor and the wall of the elevator shaft and below a lower end of the entrance opening, the light projector, the light receiver, and the reflector are supported by the support member, the light beam passes through a door closing side of a closing side edge of the door when the support member is located at the first position, and the light beam passes through the door opening side of the closing side edge of the door when the support member is located at the second position.

2. The elevator safety device according to claim 1, wherein the cam mechanism comprises: a roller operably connected to the support member;

and a contacting member that contacts the roller to allow the support member to pivotally move, the roller and the contacting member contact each other to allow the support member to be located at the second position when the door is located at a position at which the door is open, and the roller and the contacting member are separated from each other to allow the support member to be located at the first position in association with the door moving from the position at which the door is open to the door closing side.

* * * * *